United States Patent
Getz

(10) Patent No.: US 6,787,240 B2
(45) Date of Patent: Sep. 7, 2004

(54) ENHANCED LIGHT TRANSMISSION CONDUCTIVE COATED TRANSPARENT SUBSTRATE

(75) Inventor: Catherine A. Getz, Holland, MI (US)

(73) Assignee: Donnelly Corporation, Holland, MI (US)

(*) Notice: Subject to any disclaimer, the term of this patent is extended or adjusted under 35 U.S.C. 154(b) by 0 days.

(21) Appl. No.: 09/883,654

(22) Filed: Jun. 18, 2001

(65) Prior Publication Data

US 2001/0055673 A1 Dec. 27, 2001

Related U.S. Application Data

(60) Provisional application No. 60/213,663, filed on Jun. 23, 2000.

(51) Int. Cl.[7] .............................................. G32B 17/06
(52) U.S. Cl. ...................... 428/428; 428/432; 428/697; 428/699; 428/701; 428/702
(58) Field of Search .............................. 428/428, 432, 428/697, 699, 701, 702

(56) References Cited

U.S. PATENT DOCUMENTS

| | | | | |
|---|---|---|---|---|
| 4,802,737 A | * | 2/1989 | Denton | 359/588 |
| 5,805,330 A | * | 9/1998 | Byker et al. | 359/265 |
| 6,411,344 B2 | * | 6/2002 | Fujii et al. | 349/117 |
| 6,480,250 B1 | * | 11/2002 | Matsufuji et al. | 349/113 |
| 6,590,622 B1 | * | 7/2003 | Nakanishi et al. | 349/12 |

OTHER PUBLICATIONS

"Investigations on the Angle–Dependent Dip Coating Technique (ADDC) for the Production of Optical Filters," N.J. Arfsten et al., Journal of Sol–Gel Science and Technology 8, 1099–1104 (1997)© Kluwer Academic Publishers.

* cited by examiner

*Primary Examiner*—Terrel Morris
*Assistant Examiner*—Andrew T Piziali
(74) *Attorney, Agent, or Firm*—Van Dyke, Gardner, Linn & Burkhart, LLP

(57) ABSTRACT

A reduced glare, conductive coated panel having increased visible light transmission and suitable for use as a touch screen, digitizer panel or a substrate in an information display includes a transparent substrate, one or more thin film interference layers forming a thin film stack on each of the opposite surfaces of the substrate, and a transparent, electrically conductive coating on the outermost layer of one or both of the thin film stacks. The method preferably includes dipping the substrate in a solution of a precursor for the thin film material at an angle to the vertical and the surface of the solution such that the layer of one side of the substrate has a thickness different from that on the opposite side, curing the layers, and applying the transparent electrically conductive coating thereover.

16 Claims, 4 Drawing Sheets

ENHANCED LIGHT TRANSMISSION CONDUCTIVE COATED TRANSPARENT SUBSTRATE

CROSS REFERENCE TO RELATED APPLICATION

This application claims priority from U.S. Provisional Patent Application Ser. No. 60/213,663, filed on Jun. 23, 2000, the disclosure of which is hereby incorporated herein by reference in its entirety.

BACKGROUND OF THE INVENTION

This invention relates to an improved conductive coated transparent substrate as used in a touch screen, or a digitizer panel, or a substrate in an information display such as a liquid crystal display, a plasma display, a field emission display, an electroluminescent display, an electrochromic display, or a cathode ray tube display.

In the production of conductively coated transparent substrates for use in touch screens, digitizer panels or information displays such as those described above, it is desired that the screen, panel or display not only have a conductive coating providing electrical conductivity to allow activation of circuits, switches or other electrical devices controlled by the screen or panel, but also allow the maximum transmission of light so that the user of the screen, panel or display can easily read the information transmitted through the screen thereby allowing manual activation using the conductive coating layer. Typically, such screens, panels or displays make use of anti-reflective, thin film coatings or stacks to reduce or minimize glare while allowing optimal light transmission. However, the provision of a conductive coating layer on one side of a substrate including anti-reflective thin film stacks or coatings changes the optical characteristics of the coated substrate and can prevent maximized light transmission unless the anti-reflective thin films or stacks and conductive layer are properly designed, coordinated and prepared for one another.

In the past, anti-reflective, thin film coating stacks or multiple layers have been prepared either by vacuum deposition or wet deposition processes. Vacuum deposition is typically carried out through sputtering processes in which layers of thin films of materials such as metal oxides and metal halides are applied to a surface of a transparent glass or other substrate followed by a second, third, fourth or other layers which together minimize or eliminate glare due to interference. However, in order to prepare one side of such a substrate for receipt of a conductive coating layer, it is necessary that vacuum sputtering deposition of the layers on either side of such a transparent substrate be prepared differently causing greater manufacturing time and expense.

Alternately, thin film coatings making up anti-reflective stacks or multilayers can be applied by wet deposition processes including dip coating in which the substrate is dipped in a container of liquid solution while held in a position perpendicular to the solution surface. When cured such as by firing, such process results in substantially identical coatings of the same solution on either side of the substrate. Although angle dipping or dipping of a substrate in a solution when held at an angle to the solution surface is known [such as is described in "Investigations on the Angle-Dependent Dip Coating Technique (ADDC) for the Production of Optical Filters", N.J. Arfaten et al., Journal of Sol-Gel Science and Technology 8, 1099–1104 (1997) © Kluwer Academic Publishers], such angle dipping has heretofore not been used to prepare an improved conductive coated transparent substrate as in the present invention.

Accordingly, it was desired to provide a more efficient, less expensive, reduced glare, conductive coated panel having optimal light transmission, as well as a method for applying anti-reflective thin films or stacks to a transparent substrate using wet deposition processes such as dip coating while allowing preparation of the layers differently on each side of the substrate so that one or both sides are prepared for receipt of an electrically conductive coating to provide optimal light transmission characteristics through the coated substrate for use in touch screens, digitizer panels, information displays and the like.

SUMMARY OF THE INVENTION

This present invention contemplates use of angle dipping to establish one or more layers such as a multilayer stack of the same material type of thin films on the two opposite (first and second) surfaces of a substrate, and with the film thickness of an individual thin film on the second surface being different (such as for example, thicker) than its corresponding thin film (of the same material composition) on the first surface. The angle of dipping of the substrate when establishing the various layers of the multilayer stack on the respective surfaces is adjusted so that, when an additional outermost transparent conductor layer (or any other additional layer or layers) is disposed on, for example, the outermost layer of the multilayer stack having the thinner individual layer thicknesses (compared to those on the opposing surface), visible light transmission through the coated panel is increased compared to the light transmission through that substrate coated only with the electrically conductive, transparent conductor layer.

In one aspect, the invention is a reduced glare, conductive coated panel comprising a transparent substrate having a first surface and a second surface, a first, multilayer, antiglare, interference stack disposed on the first surface of the substrate, the first stack comprising a plurality of transparent, thin film layers, and a second multilayer, antiglare, interference stack disposed on the second surface of the substrate, the second stack also comprising a plurality of transparent, thin film layers. The first of the layers in the first stack is positioned on the first surface and corresponds to the first of the layers in the second stack which is positioned on the second surface. The second of the layers in the first stack is positioned on the first layer and corresponds to the second of the layers in the second stack which is positioned on the first layer of the second stack. At least one of the layers of the first stack has a thickness greater than the thickness of the corresponding layer of the second stack on the second surface. Also included is a transparent conductive coating on at least one of the thin film layer of the first stack which is spaced farthest away from the first surface and the thin film layer of the second stack which is spaced farthest away from the second surface. Visible light transmission through the coated panel is increased as compared to the substrate coated only with the transparent conductive coating.

In preferred aspects of the invention, the transparent substrate may be glass or plastic, and the transparent conductive coating is applied to the second stack which has the thinner individual layers. Alternately, the transparent conductive coating may be applied to the first stack having the thicker individual layers. As yet another option, an electrically conductive coating may be applied to each of the first and second thin film stacks such that an electrically conductive coating is on each side of the coated substrate. Should the substrate have only a single, anti-glare, interference thin film on each of the opposite substrate sides, an electrically conductive coating may be applied over the single thin film layer on one or both of the opposite sides.

Additionally, each of the first and second thin film stacks may include a third transparent thin film layer positioned, respectively, on the second layer of each stack. Each of the layers of the first and second stacks has a refractive index with the refractive index of the second layer of each of the first and second stacks preferably being greater than the reflective index of the other layers in the respective first and second stacks. Further, the refractive index of the third layer of each of the first and second stacks is preferably less than the refractive index of the other layers in those stacks.

In other aspects, the material composition of the corresponding layers in each of the first and second stacks or on opposite sides of the substrate may be the same. For example, the first layers in each of the first and second stacks maybe formed from a combination of silicon dioxide and titanium dioxide with each of the first layers having a refractive index at the sodium D line in the range of from about 1.5 to about 2.0. In addition, the second layers of each stack may be formed from titanium dioxide and have a refractive index at the sodium D line of at least about 2.0. Additionally, the third layers of each of the first and second stacks may be formed from silicon dioxide and have a refractive index at the sodium D line of less than about 1.5.

In yet another aspect, where each of the layers of the first and second stacks has a refractive index, the refractive index of the second layer of each of these first and second stacks is greater than the refractive index of the other layers in the respective stacks.

In yet another aspect, the invention is a method for making a reduced glare, conductive coated panel comprising providing a transparent substrate having a first surface and a second surface, and forming a first transparent thin film layer on the first surface and a first transparent thin film layer on the second surface by dipping the substrate in a liquid solution of a precursor of a material for the first transparent thin film layers while maintaining the substrate at an angle to the vertical whereby the first layer on the first surface has a thickness greater than the thickness of the first layer on the second surface, and applying a layer of transparent electrically conductive coating over at least one of the first layer on the first surface and the first layer on the second surface.

In preferred aspects of the method, the substrate may be fired at an elevated temperature to complete transformation of the as dipped layers into the transparent thin films prior to applying the next transparent thin film layer, or the layer of transparent electrically conductive coating.

Preferably, the angle at which the substrate is dipped in the liquid solution of precursor material is between about 5° and 25° to the vertical.

In other aspects, successive layers may be added to the layers on each side of the substrate by dipping the substrate in a liquid solution of a desired precursor material for those additional thin film layers while maintaining the substrate coated with the first layers at an angle to the vertical. Preferably, such additional layers are formed prior to application of the transparent electrically conductive coating on the last of the transparent thin film layers on the first or the second surface or both surfaces. Also, the angle at which the substrate is maintained while dipping to add such additional layers is preferably between about 5° and 25° to the vertical.

Accordingly, the present invention provides a reduced glare, conductively coated panel and a method for manufacturing same which allows preparation of each of the two sides of a substrate differently through the use of a lesser expensive, more highly efficient wet deposition process so that one side of the substrate is prepared to receive an additional electrically conductive coating layer so as to maximize light transmission through the coated substrate when such conductive coating is included.

DESCRIPTION OF THE PREFERRED EMBODIMENTS

Figure 1:
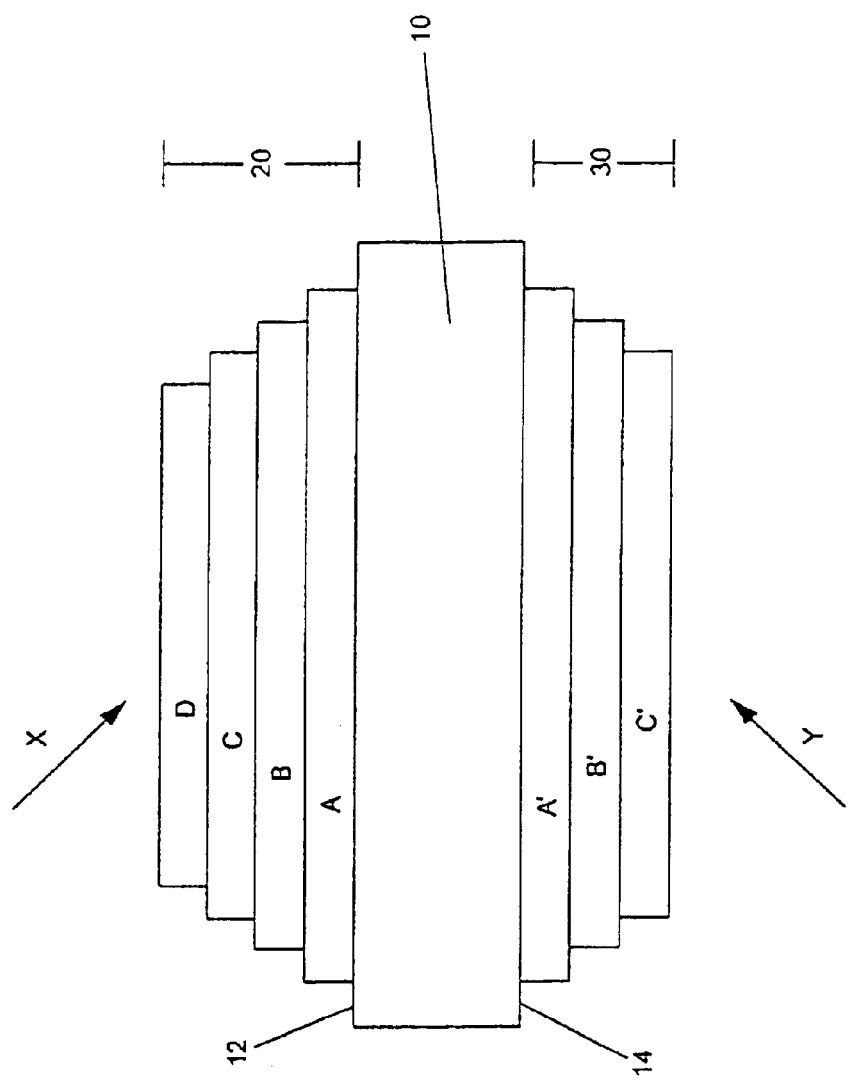
FIG. 1 is a schematic side elevation of a reduced glare, conductive coated panel in accordance with the present invention.

More specifically, and as shown in FIG. 1, the invention relates to an improved reduced-glare conductive coated panel 40 comprising a substrate 10 such as glass having a first surface 12 and a second surface 14. Optionally, the transparent substrate of the present invention may be an optical plastic comprising a conductively coated cyclic olefin copolymer plastic substrate as disclosed in U.S. provisional patent application Ser. No. 60/231,096, filed Sep. 8, 2000, entitled PLASTIC SUBSTRATE FOR INFORMATION DEVICES, the disclosure of which is hereby incorporated by reference herein in its entirety. Such rigid plastic substrate may be formed from a cyclic olefin copolymer (COC) such as is available from Ticona of Summit, N.J., under the trade name "Topas." Cyclic olefin-containing resins provide an improved material for a rigid, transparent conductively coated substrate suitable for use in an information display. The improved information display incorporating the improved plastic substrate is lightweight, durable, flex resistant, dimensionally stable and break resistant as compared to other, more conventional substrates. A rigid plastic substrate can be formed by extrusion, casting or injection molding. When injection molding is used such as when forming a substrate from a cyclic olefin copolymer (COC), a non-planar curved (spherical or multiradius) part can be formed, optionally with at least one surface roughened (such as by roughening/patterning a surface of the tool cavity used for injection molding) so as to have a light-diffusing, anti-glare property.

A transparent, plastic substrate such as one formed form cyclic olefin polymer resin can be used to form a rigid panel or back plate for use in a resistive membrane touch device where the cyclic olefin panel functions as a transparent back plate for a flexible, conductive, transparent touch member assembly as described in U.S. provisional patent application Ser. No. 60/244,557, filed Oct. 31, 2000, entitled PLASTIC SUBSTRATE FOR INFORMATION DEVICES, the disclosure of which is hereby incorporated by reference herein in its entirety.

In some applications, it may be useful to incorporate a flexible, transparent, conductively coated layer with a rigid, transparent, conductively coated substrate such as those described above to form an interactive information device such as a computer touch panel, a personal digital assistant known as a PDA, or a computer pen input device all as disclosed in U.S. provisional patent application Ser. No. 60/234,867, filed Sep. 22, 2000, entitled SPACER ELEMENTS FOR INTERACTIVE INFORMATION DEVICES, now U.S. Pat. No. 6,627,918, the disclosure of which is hereby incorporated by reference herein in its entirety. Such an assembly includes an improved process and materials for producing uniformly dispersed, consistent, durable, essentially non-visible, fixed substrate-interpane-spacer elements (for example "spacer dots") for spacing opposing conductive surfaces of the flexible top sheet and rigid bottom sheet or substrate of such an interactive information device.

With reference to FIG. 1, a multilayer antiglare interference stack 20 of interference thin films (for example a four layer multilayer stack ABCD with the individual thin films disposed relative to the first surface 12 of substrate 10) is deposited on the first surface 12 of substrate 10 which may be any of those described above. The outermost thin film D in multilayer stack 20 comprises an electrically conductive, transparent conductor (such as indium tin oxide or doped tin oxide such as Sb or F doped tin oxide or doped zinc oxide) rendering stack 20 electrically conductive. Conductive thin film D is preferably applied by vacuum deposition, and more preferably by sputtering, to the outermost surface of stack 20 regardless of whether one, two, three or more layers of individual thin films such as A, B and C are included in the stack. Layers A, B and C comprise, respectively, a medium refractive index (RI) transparent thin film A (such as a mixed silicon dioxide/titanium dioxide layer and having a refractive index at the Sodium D line of in the range of from about 1.5 to about 2.0 RI); a high refractive index transparent thin film B (such as titanium dioxide and having a refractive index at the Sodium D line of at least about 2.0 RI); and a low refractive index transparent thin film C (such as silicon dioxide and having a refractive index at the Sodium D line of less than about 1.5 RI). The refractive index (RI) of layer B is greater than the RI of either layer A or layer C, and the RI of layer C is smaller than the RI of either layer A or layer B.

A multilayer antiglare interference stack 30 of thin films (for example a three layer multilayer stack A'B'C' with the individual thin films disposed relative to the second surface 14 of substrate 10 as shown in FIG. 1) is deposited on the second surface 14 of substrate 10. In this embodiment, the outermost thin film D of multilayer stack 20 is absent from multilayer stack 30. Layers A', B' and C' comprise, respectively, the same layer materials in multilayer stack 30 as layers A, B and C in stack 20. Thus, the material composition of thin film layer A' is the same as that of medium refractive index transparent thin film A. The material composition of thin film layer B' is the same as that of high refractive index transparent thin film B. The material composition of thin film layer C' is the same as that of low refractive index transparent thin film C. The refractive index (RI) of layer B' is greater than the RI of either layer A' or layer C', and the RI of layer C' is smaller than the RI of either layer A' or layer B'.

Figure 3:
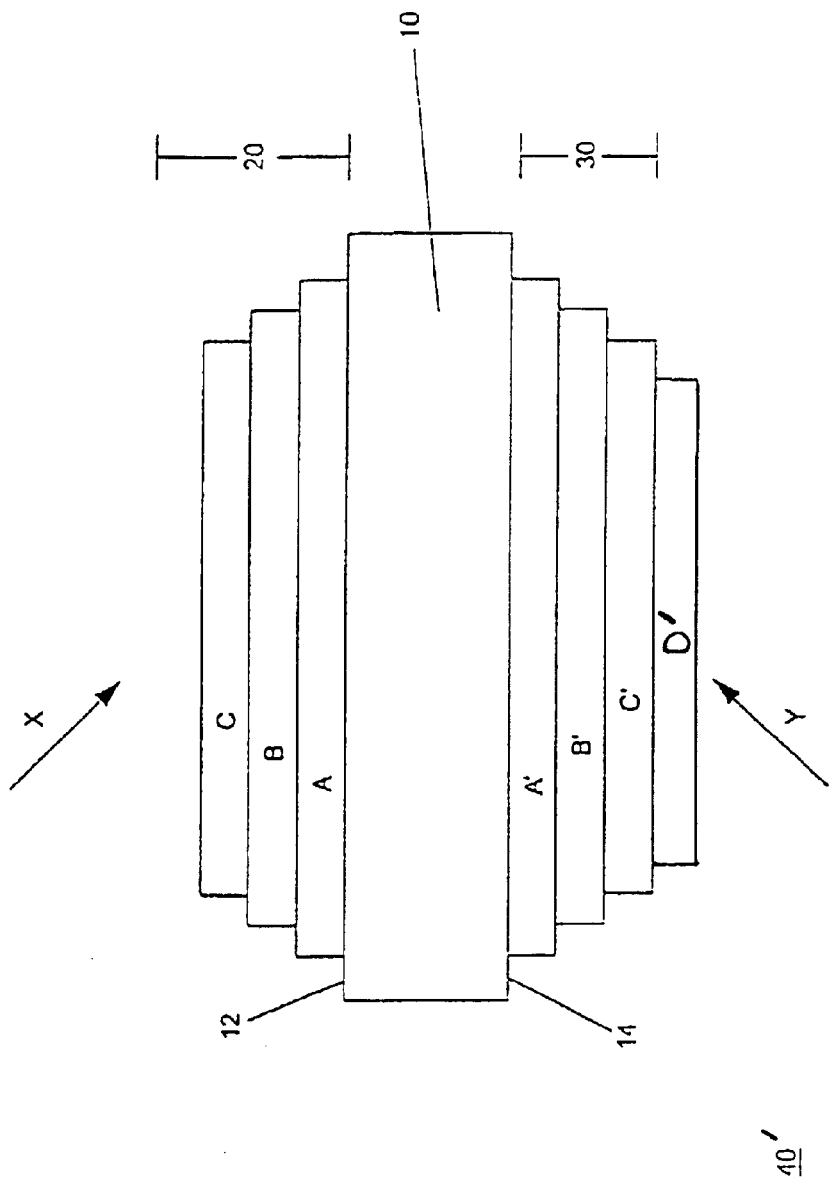
FIG. 3 is a schematic side elevation of a second embodiment of the reduced glare, conductive coated panel of the present invention.
Figure 4:
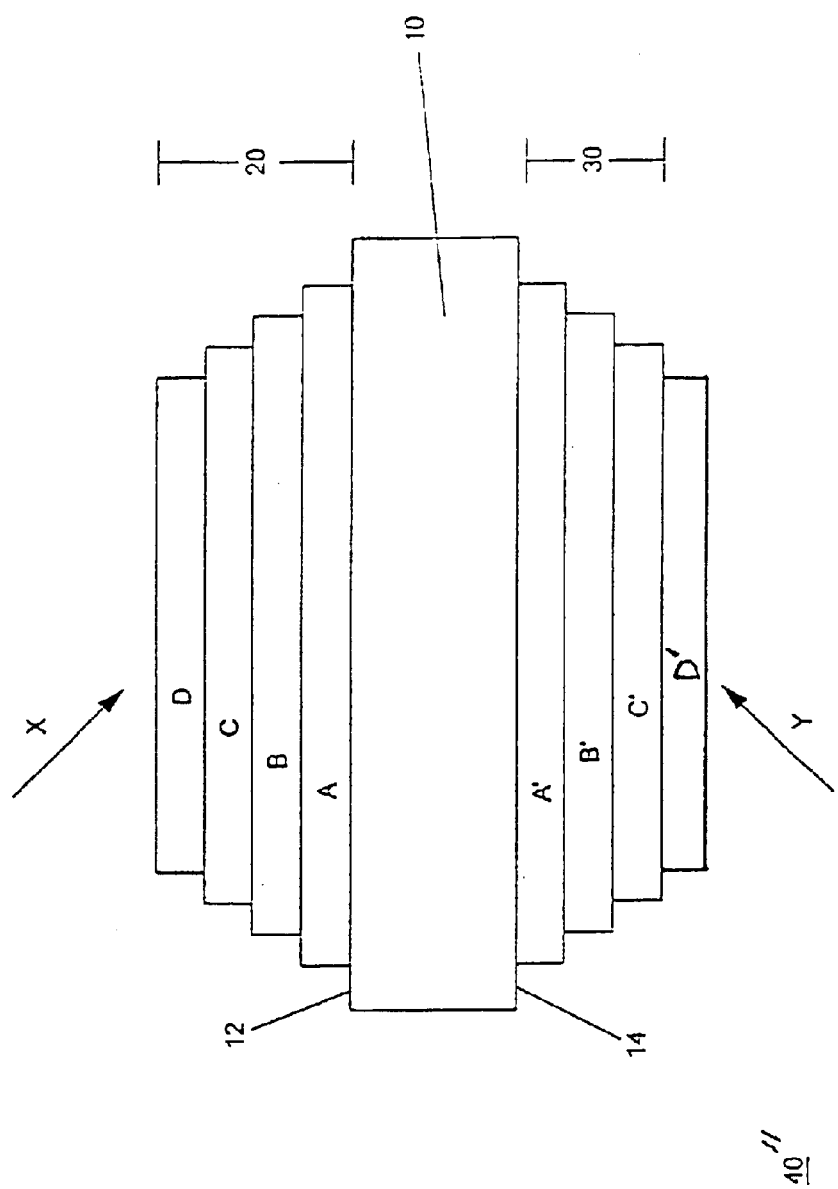
FIG. 4 is a schematic side elevation of a third embodiment of the reduced glare, conductive coated panel of the present invention.

Optionally and alternately as shown in FIG. 3, instead of applying conductive thin film D to stack 20, a thin film D' comprising an electrically conductive, transparent conductor such as indium tin oxide or doped tin oxide as described above may be applied to the outermost surface of stack 30 on panel 40' to render stack 30 electrically conductive. In such case, the electrically conductive film D is absent from stack 20. Thin film D' may be applied over the outermost surface of stack 30 regardless of whether one, two, three or more layers of individual thin films are included in the stack. Typically, thin film D or D' will be applied only to one stack 20 or 30 on only one side of substrate 10. However, in certain applications, a transparent electrically conductive coating D or D' can be applied to both stack 20 and 30 on panel 40" if desired as shown in FIG. 4 while achieving the desired optimized light transmission for this invention.

Importantly, in the preferred embodiment such as FIG. 1, the physical thickness (and hence the optical thickness) of each of layers A', B' and C' of multilayer stack 30 is different (such as thicker) than the corresponding respective physical thickness of each of layers A, B and C of multilayer stack 20. Optionally, the difference in physical thickness of layer A to layer A' can be about the same in dimension as measured in nanometers as is the difference in physical thickness of layer B to layer B' and can also be about the same in dimension as measured in nanometers as is the difference in physical thickness of layer C to layer C'. This preferably is achieved by utilizing generally the same angle of dipping for each of layer pairs A, A'; B, B'; and C, C'. Alternately, the difference in physical thickness, for example, between layer A and layer A' can itself be different than the difference in physical thickness between layer B and layer B' (or compared to the difference in physical thickness of any one layer to the other corresponding layer of that layer pair). Thus, the angle of dipping can be selected to achieve a desired difference in physical thickness within a layer pair and can also be chosen as different angle to establish a different condition for another layer pair. Also, as known in the sol-gel art, the physical thickness achieved on one surface of a substrate compared to that achieved on the opposing other surface is influenced by and a function of the withdrawal angle from the dip medium, the viscosity of the dip medium, the solids content of the dip medium, the temperature at which withdrawal from the dip medium occurs, and the speed of withdrawal of the substrate from the dip medium (i.e., the withdrawal rate of the substrate from the dip medium in inches of substrate height dimension per minute). Alternately, the orientation and angle of dipping can be adjusted and chosen so that the thickness of layers A, B, C and A', B', C' alternates between thicker and thinner on the same sides of the substrate, if desired.

As shown in FIG. 1, multilayer stack 20 reduces glare from light incident thereon for direction X and multilayer stack 30 reduces glare from light incident thereon for direction Y. Multilayer stacks 20 and 30 increase visible light transmission through panel 40 (which typically comprises a transparent glass substrate 10) by about 4% T as compared to substrate 10 coated only with transparent electrically conductive layer D; and preferably by at least about 6% T; and most preferably by at least about 8% T. Transmission is measured across the visible light spectrum using a photopic detector.

Light transmission through improved reduced glare, conductive coated panel 40 is at least about 85% T; more preferably at least about 90% T; and most preferably at least about 95% T.

Preferably, at least layers A, B, C, A', B' and C' are deposited by wet chemical deposition such as disclosed in commonly-assigned, U.S. Pat. Nos. 5,900,275 to Cronin et al., 5,277,986 to Cronin et al., and/or 5,252,354 to Cronin et al., the disclosures of which are hereby incorporated by reference herein.

Most preferably, A, B, C, A', B' and C' are deposited by an angle dipping technique whereby panel 10 is dipped at an angle H (typically in the range of about 5 degrees to about 25 degrees to vertical or about 85 degrees to about 65 degrees to the horizontal) into a solution of a precursor of the material of thin films A, A'. Films A, A' are preferably then cured with ultraviolet (UV) light and/or air dried and/or heated/fired. After establishing thin films A and A' (or their precursors) on surfaces 12 and 14 of panel 10, panel 10 is next dipped at an angle G that may be the same or different from angle H and that is typically in the range of about 5 degrees to about 25 degrees to vertical or about 85 degrees to about 65 degrees to the horizontal into a solution of a precursor of the material of thin films B, B'. Films B, B' are preferably then cured with UV light and/or air dried and/or heated/fired. After thus establishing thin films A & B and A' and B' (or their precursors) on surfaces 12 and 14 of panel 10, panel 10 is further dipped at an angle I that may be the same or different from the previous dipping angles H and/or G and that is typically in the range of about 5 degrees to about 25 degrees to vertical or about 85 degrees to about 65 degrees to the horizontal into a solution of a precursor of the material of thin films C,C' to complete establishment of thin films A, B & C and A', B' and C' (or their precursors) on surfaces 12 and 14 of panel 10. Films C, C' are preferably then cured with UV light and/or air dried and/or heated/fired. After this, and after any elevated temperature firing in an oven to assure substantial completion of transformation of the as-dipped precursors of thin films A, B & C and A', B' and C' to their final desired composition and properties, conductive coating D is deposited preferably by vacuum deposition and most preferably by sputtering on layer C to complete formation of multilayer stack 20. As noted above, coating D' may optionally be applied to stack 30, or coatings D or D' may be applied, one respectively to each of stacks 20 and 30, after formation of thin films A, B, C, A', B', or C'.

Alternately, thin films A, A', B, B' and C, C' can be respectively fired at an elevated temperature in an oven to substantially complete transformation of the as-dipped precursors of these films to their final composition and properties prior to dip application of the next layer set. Thus, thin films, A, A' can be dip-coated and fired prior to dip coating and firing of B, B', prior to dip coating and firing of C, C'.

Preferably, each of thin film layers A, B, C, A', B' and C' has a physical thickness after formation within the range of between about 0.01 and 10 microns. The specific thicknesses are selected as described above. Also, each of electrically conductive coatings D, D' may preferably have a thickness of between about 0.05 and 5 microns.

Figure 2:
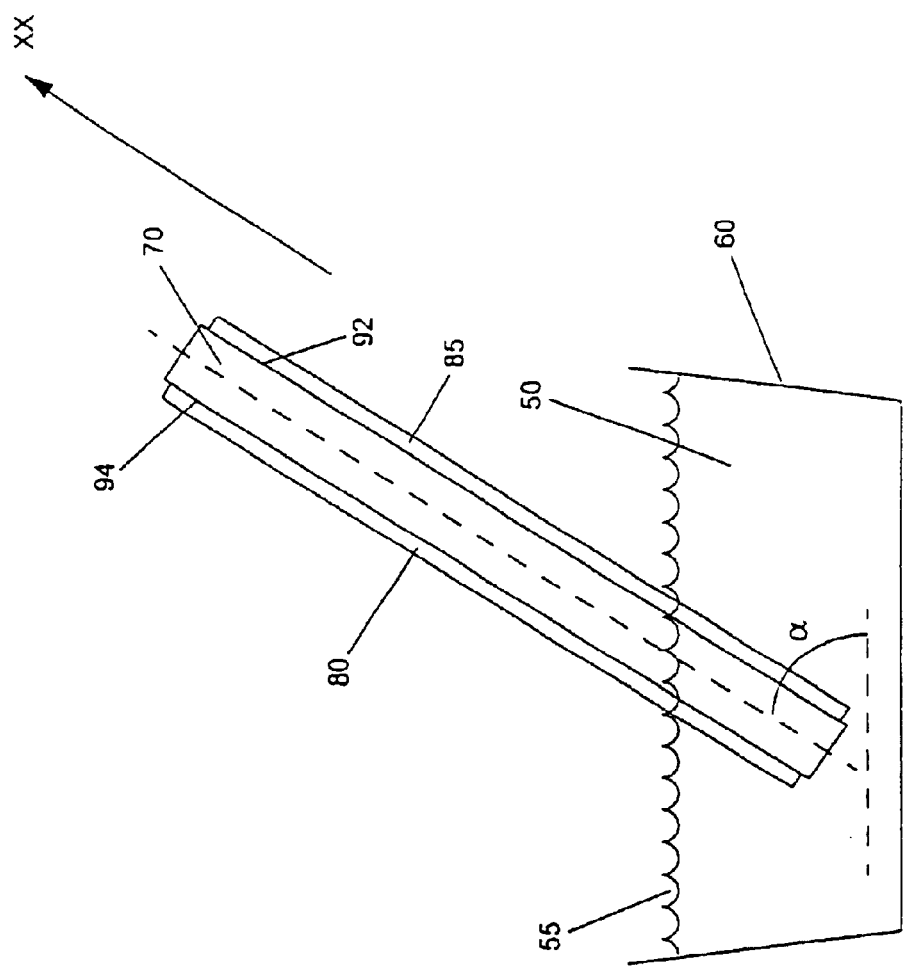
FIG. 2 is a schematic illustration of the preferred method of the present invention including dipping a substrate in a precursor solution at a predetermined angle for applying thin film layers to opposing sides of the substrate wherein the thin film layers have different thickness characteristics.

FIG. 2 shows an angle dipping method useful in the present invention. A container 60 containing a liquid dip solution 50 is provided. Substrate 70 is inserted into dip solution 50 and is withdrawn from it in the direction XX and at an angle of α degrees to the meniscus 55 of dip solution 50. Angle α can be set at angle H, G, or I as set forth above. The opposing surfaces 92,94 of substrate 70 are coated with as-dipped films 85,80, respectively, of dip solution 50. When as-dipped films 85,80 are dried/cured (such as by heating in an oven, for example, at at least 100 degrees Celsius as is conventional), the physical thickness of then cured film 85 is different than that of fired film 80, and this difference in physical thickness is dependent on the angle α used when withdrawing substrate 70 from dip solution container 60. Preferably, in this example, cured film 85 is thinner than cured film 80, and so on for the subsequent, other thin film layers.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow.

What is claimed is:

1. A reduced glare, conductive coated panel comprising:
a transparent substrate having a first surface and a second surface;
a first, multilayer stack disposed on said first surface of said substrate, said first stack comprising at least a first transparent, thin film layer, a second transparent, thin film layer and a third transparent, thin film layer;
a second, multilayer stack disposed on said second surface of said substrate, said second stack comprising at least a first transparent, thin film layer, a second transparent, thin film layer and a third transparent, thin film layer;
each thin film layer in said first stack having a corresponding thin film layer in said second stack;
each of said transparent, thin film layers of said first stack being a wet chemical formed thin film layer and having a refractive index, said first transparent, thin film layer of said first stack being disposed on said first surface of said substrate, said second transparent, thin film layer of said first stack being disposed on said first thin film layer of said first stack, and said third transparent, thin film layer of said first stack being disposed on said second thin film layer of said first stack;
each transparent, thin film layer of said second stack being a wet chemical formed thin film layer and having the refractive index of its corresponding transparent, thin film layer of said first stack; said first transparent, thin film layer of said second stack being disposed on said second surface of said substrate, said second transparent, thin film layer of said second stack being disposed on said first thin film layer of said second stack, and said third transparent, thin film layer of said second stack being disposed on said second thin film layer of said second stack;
the film thickness of any one of said thin film layers of said second stack being different than the thickness of its corresponding thin film layer of said first stack;
at least one of said thin film layers of said first stack having a thickness greater than the thickness of its corresponding thin film layer of said second stack;
the material composition of said corresponding layers in each of said first and second stacks being the same; the refractive index of each of said second thin film layers in said first and second stacks being greater than the refractive index of the other thin film layers in said first and second stacks; the refractive index of said third thin film layer in each of said first and second stacks being less than the refractive index of the other thin film layers in said first and second stacks;
a transparent conductive thin film on said third thin film layer of said first stack, said transparent conductive thin film being a vacuum deposited thin film and comprising a material selected from at least one of indium tin oxide, doped tin oxide, and doped zinc oxide; and
whereby visible light transmission through said coated panel is increased as compared to said substrate coated only with said transparent conductive thin film.

2. The coated panel of claim 1 wherein said transparent substrate is glass.

3. The coated panel of claim 1 wherein said transparent substrate is selected from the group consisting of glass and plastic.

4. The coated panel of claim 1 wherein said first layers in each of said first and second stacks are formed from a combination of silicon dioxide and titanium dioxide, each of said first layers having a refractive index at the sodium D line in the range of from about 1.5 to about 2.0.

5. The coated panel of claim 1 wherein said second layers in each of said first and second stacks are formed from titanium dioxide, said second layers each having a refractive index at the sodium D line of at least about 2.0.

6. The coated panel of claim 1 wherein said third layers in each of said first and second stacks are formed from silicon dioxide, said third layers each having a refractive index at the sodium D line of less than about 1.5.

7. The coated panel of claim 1 wherein said second stack comprises a transparent conductive thin film on said third thin film layer of said second stack, said transparent conductive thin film on said second stack being selected from at least one of indium tin oxide, doped tin oxide, and doped zinc oxide.

8. The coated panel of claim 1 wherein each of said layers of said first stack has a thickness greater than the thickness of said corresponding layer of said second stack on said second surface.

9. A reduced glare, conductive coated panel comprising:

a transparent substrate having a first surface and a second surface;

a first, transparent, interference thin film disposed on said first surface of said substrate;

a second, transparent, interference thin film disposed on said second surface of said substrate;

said first thin film corresponding to but having a thickness greater than said second thin film;

a third thin film disposed on said first thin film and a fourth thin film disposed on said second thin film, said third thin film corresponding to but having a thickness greater than said fourth thin film;

a fifth thin film disposed on said third thin film and a sixth thin film disposed on said fourth thin film, said fifth thin film corresponding to but having a thickness greater than said sixth thin film;

the material composition of each of said corresponding thin films being the same; and a transparent conductive coating on said fifth thin film, said transparent conductive coating being a vacuum deposited coating and selected from at least one of indium tin oxide, doped tin oxide, and doped zinc oxide;

each of said first, second, third, fourth, fifth and sixth thin films being a wet chemical formed thin film and having a refractive index, the refractive index of said third and fourth thin films being greater than the refractive index of the other thin films, said refractive index of the fifth and sixth thin films being less than the refractive index of the other thin films; and whereby visible light transmission through said coated panel is increased compared to said substrate coated only with said transparent conductive coating.

10. The coated panel of claim 9 also including said transparent conductive coating on said sixth thin film.

11. The coated panel of claim 4 wherein said second layers in each of said first and second stacks are formed from titanium dioxide, said second layers each having a refractive index at the sodium D line of at least about 2.0.

12. The coated panel of claim 11 wherein said third layers in each of said first and second stacks are formed from silicon dioxide, said third layers each having a refractive index at the sodium D line of less than about 1.5.

13. The coated panel of claim 1 wherein said wet chemical formed thin film layers comprise angle dipped thin film layers wherein said substrate is dipped into a liquid solution of a precursor of the respective first, second or third thin film layers while maintaining said substrate at a predetermined angle to the vertical to simultaneously coat each of said first and second surfaces of said substrate or the previous thin film layers on said first and second surfaces of said substrate, following which said coated layers are cured with at least one of ultraviolet light, air drying and heating/firing.

14. The coated panel of claim 13 wherein said vacuum deposited thin film comprises a sputtered thin film.

15. The coated panel of claim 9 wherein said wet chemical formed thin films comprise angle dipped thin films wherein said substrate is dipped into a liquid solution of a precursor of the respective first and second, or third and fourth, or fifth and sixth thin films while maintaining said substrate at a predetermined angle to the vertical to simultaneously coat each of said first and second surfaces of said substrate or the previous thin films on said first and second surfaces of said substrate, following which said coated layers are cured with at least one of ultraviolet light, air drying and heating/firing.

16. The coated panel of claim 15 wherein said vacuum deposited coating comprises a sputtered coating.

\* \* \* \* \*

UNITED STATES PATENT AND TRADEMARK OFFICE
CERTIFICATE OF CORRECTION

| | | |
|---|---|---|
| PATENT NO. | : 6,787,240 B2 | Page 1 of 1 |
| APPLICATION NO. | : 09/883654 | |
| DATED | : September 7, 2004 | |
| INVENTOR(S) | : Catherine A. Getz | |

It is certified that error appears in the above-identified patent and that said Letters Patent is hereby corrected as shown below:

<u>Column 1</u>:
Line 63, "Arfaten" should be --Arfsten--.

Signed and Sealed this

Fourth Day of July, 2006

JON W. DUDAS
*Director of the United States Patent and Trademark Office*